US007736040B2

(12) United States Patent
Fujiwara et al.

(10) Patent No.: US 7,736,040 B2

(45) Date of Patent: Jun. 15, 2010

(54) VEHICLE HEADLAMP SYSTEM AND VEHICLE HEADLAMP FOR USE THEREIN

(75) Inventors: Shohei Fujiwara, Shizuoka (JP); Michio Tsukamoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 111 days.

(21) Appl. No.: 12/048,317

(22) Filed: Mar. 14, 2008

(65) Prior Publication Data

US 2008/0225539 A1 Sep. 18, 2008

(30) Foreign Application Priority Data

Mar. 15, 2007 (JP) ............................ 2007-067522

(51) Int. Cl.
*B60Q 1/00* (2006.01)
*F21V 19/02* (2006.01)
*F21S 8/10* (2006.01)

(52) U.S. Cl. ...................... 362/545; 362/507; 362/523; 362/543; 362/544

(58) Field of Classification Search ................ 362/507, 362/543, 544, 545

See application file for complete search history.

(56) References Cited

U.S. PATENT DOCUMENTS

| | | | | |
|---|---|---|---|---|
| 5,941,633 A * | 8/1999 | Saito et al. | 362/543 |
| 6,796,695 B2 * | 9/2004 | Natsume | 362/518 |
| 7,108,412 B2 * | 9/2006 | Ishida et al. | 362/518 |
| 7,131,758 B2 * | 11/2006 | Ishida | 362/545 |
| 2004/0125610 A1 | 7/2004 | Lekson et al. | |
| 2005/0018443 A1 | 1/2005 | Tsukamoto | |
| 2005/0094413 A1 | 5/2005 | Sazuka et al. | |

FOREIGN PATENT DOCUMENTS

| | | | |
|---|---|---|---|
| CN | 1576689 A | 2/2005 |
| EP | 0158330 A2 | 10/1985 |
| EP | 1388707 A2 | 2/2004 |
| JP | 2003-242810 A | 8/2003 |
| JP | 2005-141919 A | 6/2005 |

OTHER PUBLICATIONS

Extended European Search Report dated Jul. 1, 2008.

Korean Office Action dated Oct. 30, 2009 in Application No. 10-2008-0020781, 7 pages.

Chinese First Office Action issued in counterpart Chinese Application No. 2008100837631 dated Jul. 10, 2009.

* cited by examiner

*Primary Examiner*—Jong-Suk (James) Lee
*Assistant Examiner*—David R Crowe
(74) *Attorney, Agent, or Firm*—Sughrue Mion, PLLC

(57) ABSTRACT

A vehicle headlamp system and a vehicle headlamp are provided. The headlamp system includes a plurality of headlamps, one headlamp disposed on each of the right and left sides of a front end portion of a vehicle. Each of the headlamps includes a lamp body having an opening portion, a transparent cover attached to the opening portion to form a lamp chamber, and a plurality of lamp units arranged inside the lamp chamber along a width direction of the vehicle. An outer side portion of the transparent cover extends toward a rear side of the vehicle. Each of the lamp units includes a light emitting element disposed such that a light emitting surface thereof faces an inner side in the width direction of the vehicle, and a reflector disposed on an inner side of the light emitting element to forwardly reflect light from the corresponding light emitting element.

15 Claims, 6 Drawing Sheets

16L
16La
16R
16Ra
32
32a
32b
Ax
34L
44L
54L
34R
44R
54R

VEHICLE HEADLAMP SYSTEM AND VEHICLE HEADLAMP FOR USE THEREIN

FIELD OF THE INVENTION

Apparatuses consistent with the present invention relate to vehicle headlamps and, more particularly, to vehicle headlamps and vehicle headlamp systems using the vehicle headlamps in which light emitting elements are used as light sources of the vehicle headlamps.

DESCRIPTION OF THE RELATED ART

Generally, a vehicle is provided with a vehicle headlamp system in which related art vehicle headlamps are disposed in pairs, with a headlamp on each of the right and left sides of a front end portion of the vehicle. In recent years, light emitting elements have increasingly been used as light sources of such headlamps.

However, the related art vehicle headlamp systems have some disadvantages. For example, it is difficult to ensure sufficient brightness of a low-beam light distribution pattern with light irradiated from the respective headlamps. In an attempt to obtain sufficient brightness of a low-beam light distribution pattern, there has been proposed a related art vehicle headlamp system in which a plurality of lamp units are arranged in each of the headlamps (see, e.g., JP 2005-141919 A).

JP 2005-141919 A describes a related art headlamp in which some of the lamp units are arranged along a width direction of the vehicle, and at least one of the lamp units includes a light emitting element facing downward and a reflector disposed below the light emitting element to forwardly reflect light from the light emitting element.

However, the related art headlamp described in JP 2005-141919 A has a disadvantage in that a space required for each of the lamp units is large because each reflector which is disposed below the light emitting element extends on either side of the light emitting element in order to create the light distribution pattern. Accordingly, the related art headlamp has a disadvantage in that that it is difficult to downsize the headlamp. This creates the additional disadvantage in that a vehicle using the related art headlamps is similarly difficult to downsize.

Moreover, the related art headlamp has a transparent cover formed to extend rearward on an outer side in the width direction of the vehicle in order to cover and protect the headlamps. Thus, this transparent cover also makes it more difficult to downsize the headlamp and the vehicle using the headlamp.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the disadvantages described above.

It is an aspect of the present invention to provide a vehicle headlamp system having a plurality of headlamps, one disposed on each of the right and left sides, respectively, of a front end portion of a vehicle, in which each of the headlamps is operable to irradiate light for forming a low-beam light distribution pattern and each of the headlamps has arranged therein a plurality of lamp units, the vehicle headlamp system capable of being downsized and taking up less physical space than the related art vehicle headlamp system.

According to an exemplary embodiment of the present invention, a vehicle headlamp system includes a plurality of headlamps, one disposed on each of the right and left sides of a front end portion of a vehicle, and each of the headlamps configured to irradiate light for forming a low-beam light distribution pattern. Each of the headlamps includes a lamp body having an opening portion, a transparent cover attached to the opening portion of the lamp body to form a lamp chamber, and a plurality of lamp units arranged inside the lamp chamber along a width direction of the vehicle. An outer side portion of the transparent cover with respect to the width direction of the vehicle extends toward a rear side of the vehicle. Each of the lamp units includes a light emitting element disposed such that a light emitting surface thereof faces an inner side in the width direction of the vehicle, and a reflector disposed on an inner side of the light emitting element with respect to the width direction of the vehicle to forwardly reflect light from the corresponding light emitting element.

According to another exemplary embodiment of the present invention, there is provided a vehicle headlamp comprising a lamp body having an opening portion; a transparent cover attached to the opening portion of the lamp body to form a lamp chamber, an outer side portion of the transparent cover with respect to a width direction of the vehicle extending toward a rear side of the vehicle; and a plurality of lamp units arranged inside the lamp chamber along the width direction of the vehicle, wherein each of the lamp units comprises a light emitting element disposed such that a light emitting surface thereof faces an inner side in the width direction of the vehicle; and a reflector disposed on an inner side of the light emitting element with respect to the width direction of the vehicle to forwardly reflect light from the corresponding light emitting element.

DESCRIPTION OF EXEMPLARY EMBODIMENTS OF THE PRESENT INVENTION

Hereinafter, exemplary embodiments of the present invention will be described with reference to the drawings. The following exemplary embodiments do not limit the scope of the invention.

Figure 1:
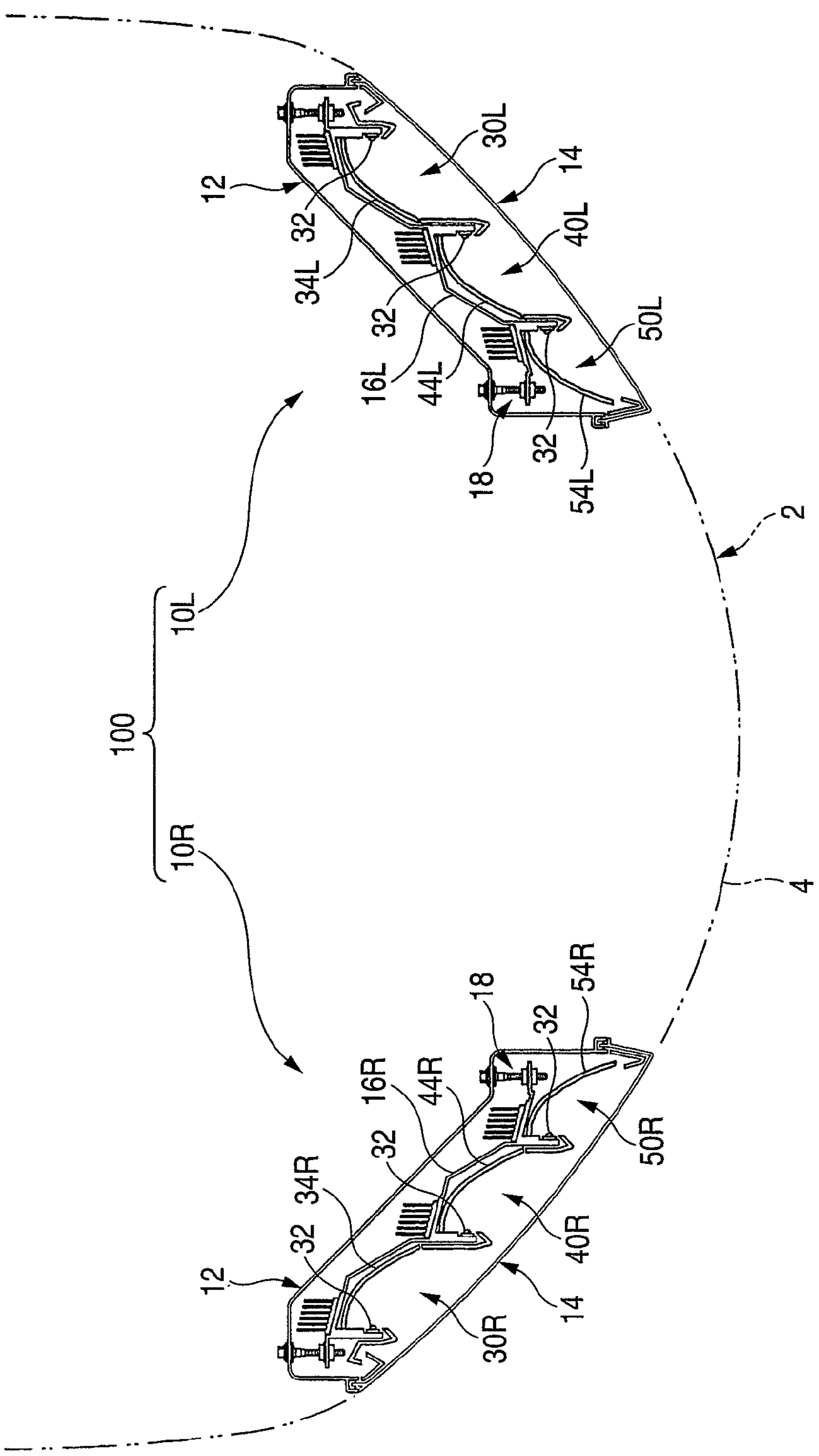
FIG. 1 is a sectional plan view of a vehicle headlamp system according to an exemplary embodiment of the invention.

FIG. 1 is a sectional plan view of a vehicle headlamp system 100 according to an exemplary embodiment of the invention.

As shown in FIG. 1, the vehicle headlamp system 100 includes a plurality of headlamps, in this exemplary embodiment two headlamps 10R, 10L, one disposed on each of the right and left sides of a front end portion of a vehicle 2. The vehicle 2 has a vehicle body 4 whose front exterior extends rearward from an inner side to an outer side in a width direction of the vehicle 2. The respective headlamps 10R, 10L are disposed so as to conform with the exterior of the vehicle body 4.

Each of the headlamps 10R, 10L is operable to irradiate light for forming a low-beam light distribution pattern. Light for forming a high-beam light distribution pattern is irradiated from other headlamps which are not shown.

In the exemplary embodiment of the present invention described in FIG. 1, the respective headlamps 10R, 10L are transversely symmetrical with each other. However, the headlamps need not be transversely symmetrical with each other, and the present inventive concept applies equally well to headlamps that are not transversely symmetrical with each other. Firstly, the configuration of the headlamp 10L on the left side of the vehicle 2 (the right side in FIG. 1) will be described, and thereafter, the configuration of the headlamp 10R on the right side of the vehicle 2 will be described.

Figure 2:
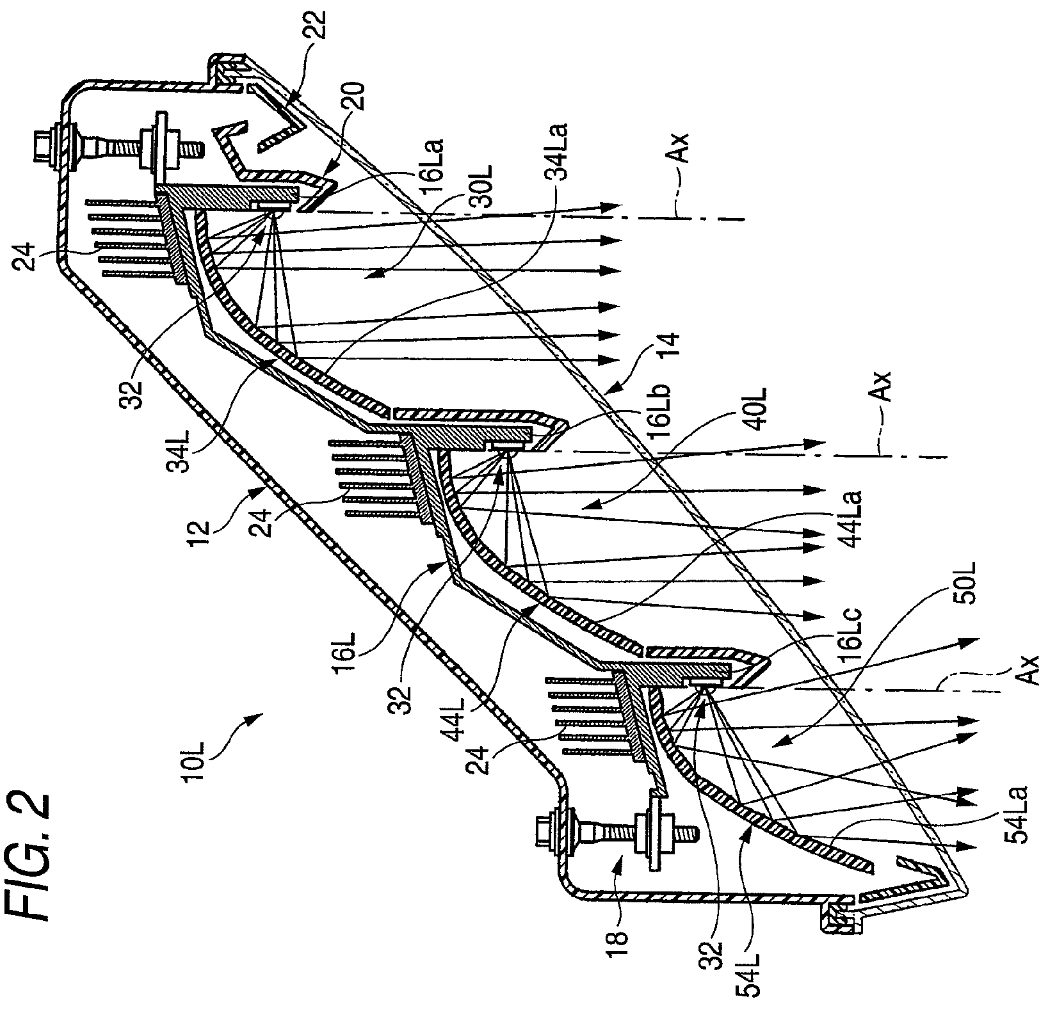
FIG. 2 is a sectional plan view of a left-side headlamp of the vehicle headlamp system of FIG. 1.

FIG. 2 is a sectional plan view of the left-side headlamp 10L of the vehicle headlamp system of FIG. 1.

As shown in FIG. 2, the headlamp 10L includes a lamp body 12 having a front opening portion, a transparent cover 14 attached to the front opening portion of the lamp body 12 to form a lamp chamber with the lamp body 12, and three lamp units 30L, 40L, 50L accommodated inside the lamp chamber. The lamp units 30L, 40L, 50L are arranged along the width direction of the vehicle 2.

The transparent cover 14 is formed along the exterior of the vehicle body 14, i.e. the transparent cover 14 extends rearward from the inner side to the outer side in the width direction of the vehicle 2. The lamp units 30L, 40L, 50L are arranged along the transparent cover 14, and the lamp units 30L, 40L, 50L are arranged such that the lamp unit on the outer side in the width direction of the vehicle 2 is disposed on a rear side of the lamp unit on the inner side in the width direction of the vehicle 2. In other words, lamp unit 40L is disposed on the rear side of lamp unit 50L, and lamp unit 30L is disposed on the rear side of lamp unit 40L.

The headlamp 10L further includes a metallic bracket 16L on which the three lamp units 30L, 40L, 50L are fixedly supported. The metallic bracket 16L extends in the width direction of the vehicle 2 inside the lamp chamber, and is supported by the lamp body 12 via an aiming mechanism 18 having a plurality of aiming screws such that the metallic bracket 16L is tiltable in right-and-left direction and in up-and-down direction with respect to the lamp body 12. Accordingly, in the headlamp 10L, optical axes Ax of the three lamp units 30L, 40L, 50L are collectively adjustable.

The optical axes Ax of the lamp units 30L, 40L, 50L are parallel to each other. The optical axes Ax are adjusted by tilting the metallic bracket 16L with the aiming mechanism 18 such that the respective optical axes Ax extend in a front-and rear direction of the vehicle 2.

The headlamp 10L further includes an extension member 20 surrounding a portion of a front side area of each of the lamp units 30L, 40L, 50L. The extension member 20 is fixedly supported by the metallic bracket 16.

The headlamp 10L further includes another extension member 22 surrounding an outer peripheral of a set of the lamp units 30L, 40L, 50L on a rear side of the transparent cover 14. The extension member 22 is fixedly supported by the lamp body 12 inside the lamp chamber.

Each of the lamp units 30L, 40L, 50L includes a light emitting element 32 oriented to face the inner side with respect to the width direction of the vehicle 2, and a reflector 34L, 44L, 54L disposed on the inner side of the light emitting element 32 with respect to the width direction of the vehicle 2. Each of the reflectors 34L, 44L, 54L forwardly reflects light from the corresponding light emitting element 32.

The metallic bracket 16L has a stepped shape when seen in a plan view. The metallic bracket 16L includes a front surface, and three vertical wall portions 16La, 16Lb, 16Lc forwardly extending from three portions on the front surface along the width direction of the vehicle 2. Each of the light emitting elements 32 of the lamp units 30L, 40L, 50L is fixedly supported by a corresponding one of the vertical wall portions 16La, 16Lb, 16Lc such that each of the light emitting elements 32 is disposed inside a recessed portion formed on a wall surface of the corresponding one of the vertical wall portions 16La, 16Lb, 16Lc on the inner side with respect to the width direction of the vehicle 2.

A portion of the metallic bracket 16L on a rear side of the lamp units 30L, 40L, 50L are rearwardly inclined from the inner side to the outer side in the width direction of the vehicle 2. The metallic bracket 16L further includes a rear surface to which heat sinks 24 are fixedly joined on the rear side of the lamp units 30L, 40L, 50L, respectively.

Figure 4A:
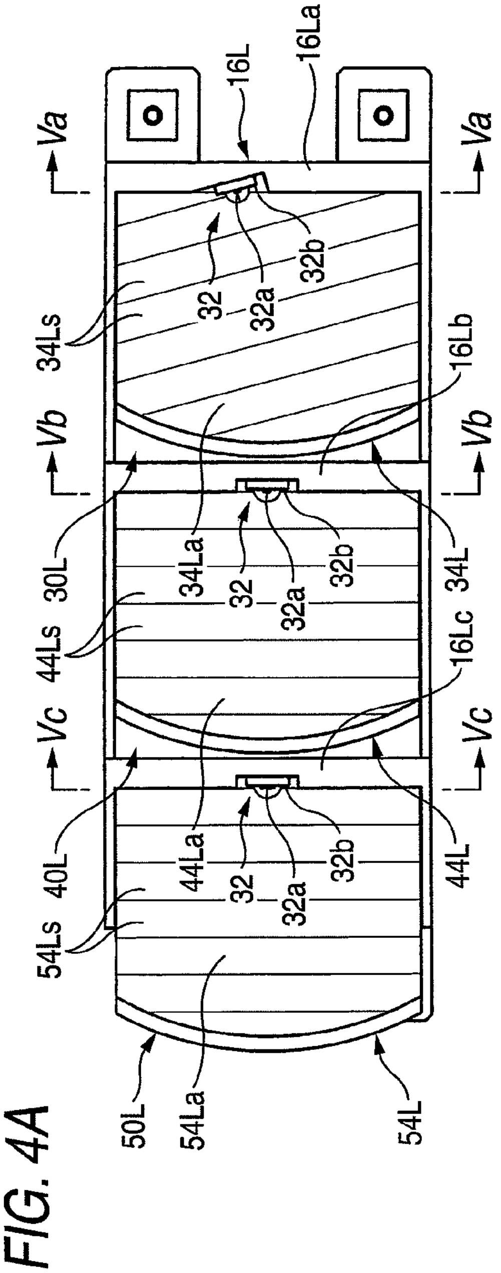
FIG. 4A is a front view showing three lamp units and a metallic bracket of the left-side headlamp of FIG. 2.
Figures 5A, 5B, 5C, 5D, 5E, 5F:
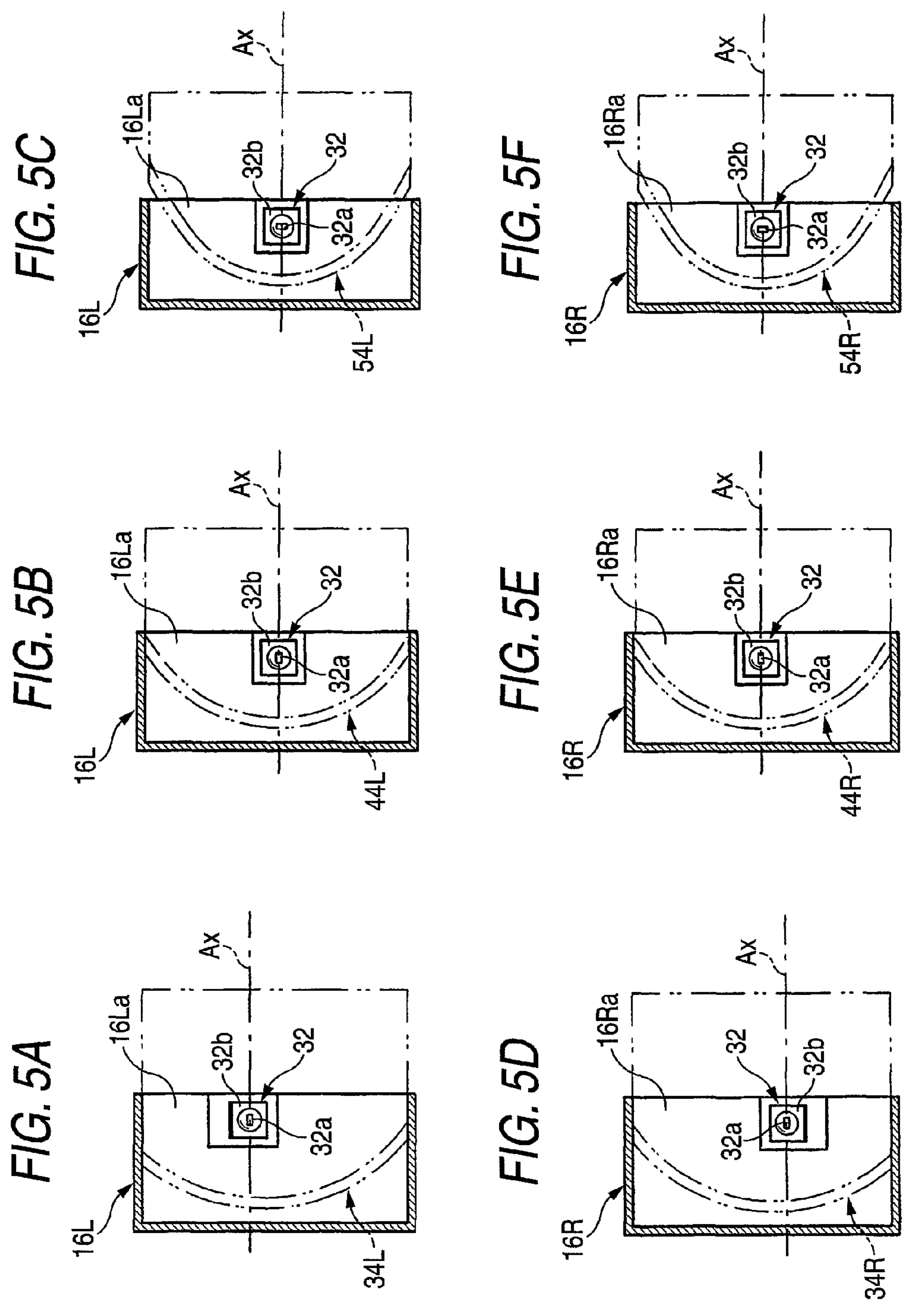
FIG. 5A is a sectional view taken along the line Va-Va in FIG. 4A.
FIG. 5B is a sectional view taken along the line Vb-Vb in FIG. 4A.
FIG. 5C is a sectional view taken along the line Vc-Vc in FIG. 4A.
FIG. 5D is a sectional view taken along the line Vd-Vd in FIG. 4B.
FIG. 5E is a sectional view taken along the line Ve-Ve in FIG. 4B.
FIG. 5F is a sectional view taken along the line Vf-Vf in FIG. 4B.

FIG. 4A is a front view of the left-side headlamp 10L of FIG. 2 showing the three lamp units 30L, 40L, 50L and the metallic bracket 16L. FIG. 5A is a sectional view taken along the line Va-Va in FIG. 4A, FIG. 5B is a sectional view taken along the line Vb-Vb in FIG. 4A, and FIG. 5C is a sectional view taken along the line Vc-Vc in FIG. 4A.

As shown in the figures, the light emitting elements 32 of the respective lamp units 30L, 40L, 50L have the same configuration. More specifically, each of the light emitting elements 32 is a white light emitting diode. Each of the light emitting elements 32 includes a light emitting chip 32*a* having a rectangular light emitting surface, dimensions of which are about 1 mm by about 2 mm, for example; a substrate 32*b* on which the light emitting chip 32*a* is supported; and a sealing resin having semi-spherical shape to cover the light emitting chip 32*a*.

The light emitting element 32 of the lamp unit 30L disposed on the outer side in the width direction of the vehicle 2 and the light emitting element 32 of the lamp unit 40L disposed in the middle among the three lamp units 30L, 40L, 50L are arranged such that a long side of the rectangular light emitting chip 32*a* of each of the light emitting elements 32 extends in a horizontal direction, while the light emitting element 32 of the lamp unit 50L disposed on the inner side in the width direction of the vehicle 2 is arranged such that a long side of the rectangular light emitting chips 32*a* extends in a vertical direction.

Further, the light emitting element 32 of the lamp unit 40L in the middle and the light emitting element 32 of the lamp unit 50L on the inner side are arranged such that the light emitting surface of the light emitting chip 32*a* of each of the light emitting elements 32 faces toward the inner side in the width direction of the vehicle 2 and such that the light emitting surface of the light emitting chip 32*a* of each of the light emitting elements 32 are parallel to the vertical direction. The light emitting element 32 of the lamp unit 30L on the outer side is arranged such that the light emitting surface of the light emitting chip 32*a* thereof faces toward the inner side in the width direction of the vehicle 2 but obliquely downward with respect to the vertical direction (e.g., about 15° downward with respect to the vertical direction).

Each of the reflectors 34L, 44L, 54L of the lamp units 30L, 40L, 50L, respectively, includes a reflecting surface 34La, 44La, 54La, respectively, which is formed in accordance with a paraboloid of revolution as a reference surface. A center axis of the paraboloid of revolution is coincident with the corresponding one of the optical axes Ax, and a focal point of the paraboloid of revolution is coincident with a light emitting center of the corresponding light emitting element 32. Each of the reflecting surfaces 34La, 44La, 54La includes a plurality of reflecting elements 34Ls, 44Ls, 54Ls, respectively, arranged in a striped pattern.

With regard to a focal length of the paraboloid of revolution, which is the reference surface for each of the reflecting surfaces 30La, 44La, 54La, the focal length of the reflecting surface 34La of the reflector 34L on the outer side in the width direction of the vehicle 2 is the longest, while the focal length of the reflecting surface 54La of the reflector 54L on the inner side in the width direction of the vehicle 2 is the shortest.

Further, the plurality of reflecting elements 44Ls of the reflecting surface 44La of the reflector 44L disposed in the middle among the three reflectors 34L, 44L, 54L and the plurality of reflecting elements 54Ls of the reflecting surface 54La of the reflector 54L on the inner side extend in the vertical direction when seen in the front view. The plurality of reflecting elements 34Ls of the reflecting surface 34La of the reflector 34 on the outer side extends in a direction inclined to the left with respect to the vertical direction when seen in the front view, e.g., by about 15°.

Each of the reflectors 34L, 44L, 54L is formed to have a constant vertical dimension, and is fixedly supported by the metallic bracket 16L at its end surface on the outer side with respect to the width direction of the vehicle 2 and at its upper and lower end surfaces.

Further, the light emitting element 32 of the lamp unit 40L in the middle and the light emitting element 32 of the lamp unit 50L on the inner side are disposed at a center with respect to the vertical dimension of the corresponding one of the reflectors 44L, 54L. (see FIGS. 5B and 5C). The light emitting element 32 of the lamp unit 30L on the outer side is disposed at a position slightly above a center with respect to the vertical dimension of the corresponding reflector 34L. (compare FIG. 5A with FIGS. 5B and 5C). According to the configuration of this exemplary embodiment, it is possible to cause the light from the light emitting element 32, which is oriented to face the inner side in the width direction of the vehicle 2 and obliquely downward with respect to the vertical direction, to be incident on the reflecting surface 34La of the reflector 34L as much as possible.

The reflector 44L in the middle and the reflector 54L on the inner side reflects the light from the corresponding one of the light emitting elements 32 such that the reflected light is diffused in the horizontal direction. The reflector 34L on the outer side reflects the light from the corresponding light emitting element 32 such that the reflected light is diffused in a direction rightwardly inclined about 15° with respect to the horizontal direction.

The surfaces of the respective reflecting elements 34Ls of the reflector 34L on the outer side are configured to reflect the light from the corresponding light emitting element 32 slightly downward and toward the left with a small diffuse angle. The surfaces of the respective reflecting elements 44Ls of the reflector 44L in the middle are configured to reflect the light from the corresponding light emitting element 32 slightly downward and slightly leftward with a relatively small diffuse angle. The surfaces of the respective reflecting elements 54Ls of the reflector 54L on the inner side are configured to reflect light from the corresponding light emitting element 32 downward and slightly leftward with a relatively large diffuse angle.

Next, the configuration of the headlamp 10R disposed on the right side of the vehicle 2 will be described.

Figure 3:
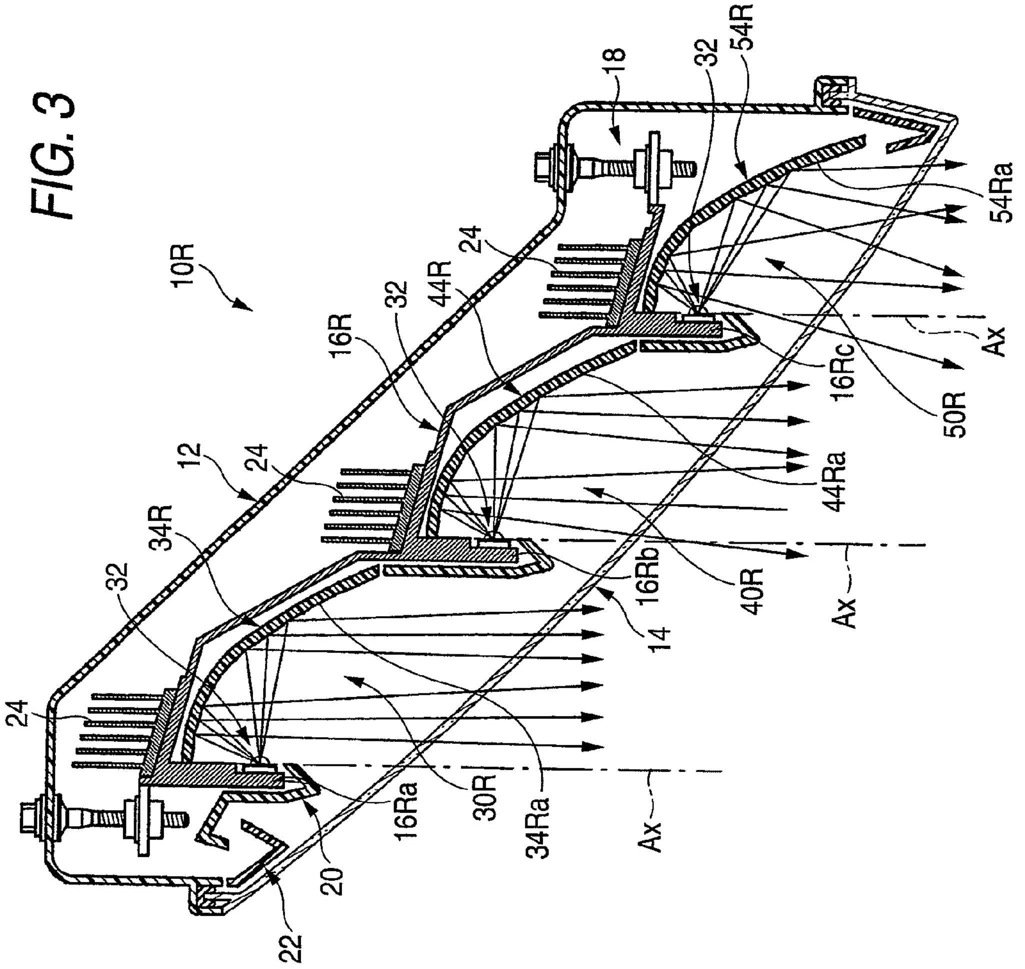
FIG. 3 is a sectional plan view of a right-side headlamp of the vehicle headlamp system of FIG. 1.

FIG. 3 is a sectional plan view of the right-side headlamp 10R of FIG. 1.

As shown in FIG. 3, the right-side headlamp 10R has a similar configuration as the left-side headlamp 10L. The right-side headlamp 10R includes a lamp body 12 having a front opening portion, a transparent cover 14 attached to the front opening portion of the lamp body 12 to form a lamp chamber with the lamp body 12, and three lamp units 30R, 40R, 50R accommodated inside the lamp chamber. The lamp units 30R, 40R, 50R are arranged along the width direction of the vehicle 2.

Each of the lamp units 30R, 40R, 50R includes a light emitting element 32 oriented to face the inner side with respect to the width direction of the vehicle 2 and a reflector 34R, 44R, 54R disposed on the inner side of the light emitting element 32 with respect to the width direction of the vehicle 2. Each of the reflectors 34R, 44R, 54R forwardly reflects light from the corresponding light emitting element 32.

Figure 4B:
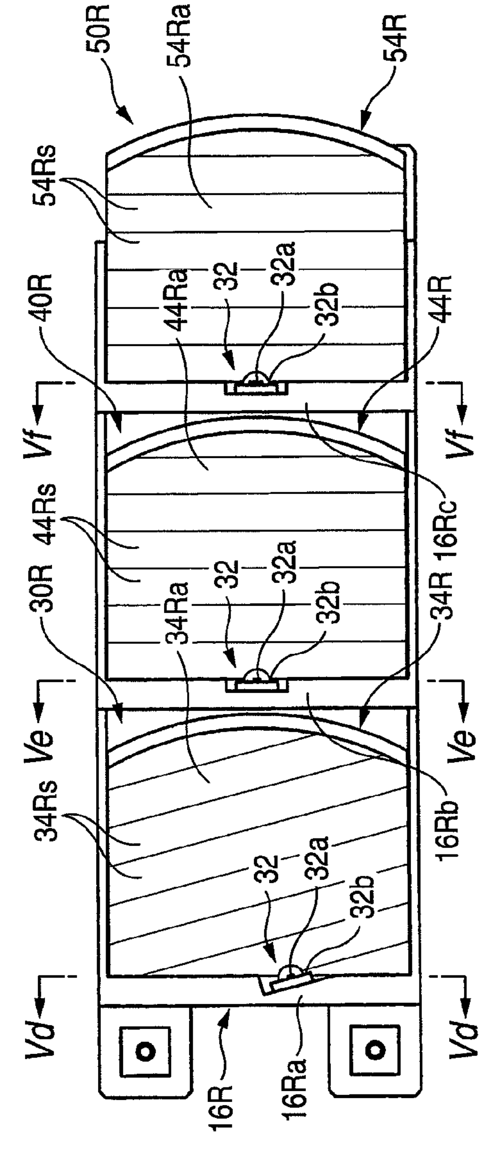
FIG. 4B is a front view showing three lamp units and a metallic bracket of the right-side headlamp of FIG. 3.

FIG. 4B is a front view of the headlamp 10R showing the three lamp units 30R, 40R, 50R and a metallic bracket 16R. FIG. 5D is a sectional view taken along the line Vd-Vd in FIG. 4B, FIG. 5E is a sectional view taken along the line Ve-Ve in FIG. 4B, and FIG. 5F is a sectional view taken along the line Vf-Vf in FIG. 4B.

As shown in the figures, the lamp unit 40R disposed in the middle among the three lamp units 30R, 40R, 50R and the lamp unit 50R disposed on the inner side in the width direction of the vehicle 2 have transversely symmetrical configurations with the lamp units 40L, 50L of the left-side headlamp 10L. However, a configuration of the lamp unit 30R disposed on the outer side in the width direction of the vehicle 2 is different from that of the lamp unit 30L of the left-side headlamp 10L.

More specifically, the light emitting element 32 of the lamp unit 30R is arranged such that the light emitting surface of the light emitting chip 32*a* thereof faces toward the inner side in the width direction of the vehicle 2 but obliquely upward with respect to the vertical direction (e.g., about 15° upward with respect to the vertical direction). Further, like the light emitting element 32 of the lamp unit 30L of the heft-hand headlamp 10L, the light emitting element 32 of the lamp unit 30R is arranged such that a long side of the rectangular light emitting chips 32*a* thereof extends in the horizontal direction.

Furthermore, like the reflector 34L of the lamp unit 30L of the left-side headlamp 10L, the reflector 34R of the lamp unit 30R includes a reflecting surface 34Ra, which is formed in accordance with a paraboloid of revolution as a reference surface. A center axis of the paraboloid of revolution is coincident with the optical axis Ax of the lamp unit 30R, and a focal point of the paraboloid of revolution is coincident with a light emitting center of the light emitting element 32. A focal length of the of the paraboloid of revolution, which is the reference surface for the reflecting surface 30Ra, is the same as that in the reflector 34L. The reflecting surface 34Ra includes a plurality of reflecting elements 34Rs arranged in a striped pattern. The plurality of reflecting elements 34Rs of the reflecting surface 34Ra extends in a direction inclined to the left with respect to the vertical direction when seen in the front view, e.g., by about 15°.

The light emitting element 32 of the lamp unit 30R is disposed at a position slightly below a center with respect to the vertical dimension of the reflector 34R. According to the configuration of this exemplary embodiment, it is possible to cause the light from the light emitting element 32, which is oriented to face the inner side in the width direction of the vehicle 2 and obliquely upward with respect to the vertical direction, to be incident on the reflecting surface 34Ra of the reflector 34R as much as possible.

The reflector 34R reflects the light from the corresponding light emitting element 32 such that the reflected light is diffused in a direction rightwardly inclined about 15° with respect to the horizontal direction. The surfaces of the respective reflecting elements 34Rs of the reflector 34R are configured to reflect the light from the corresponding light emitting element 32 slightly downward and toward the left with a small diffuse angle.

Each of the light emitting elements 32 of the lamp units 30R, 40R, 50R is fixedly supported by a corresponding one of vertical wall portions 16Ra, 16Rb, 16Rc of the metallic bracket 16R such that each of the light emitting elements 32 is disposed inside a recessed portion formed on a wall surface of the corresponding one of the vertical wall portions 16Ra, 16Rb, 16Rc on the inner side with respect to the width direction of the vehicle 2.

Figure 6A:
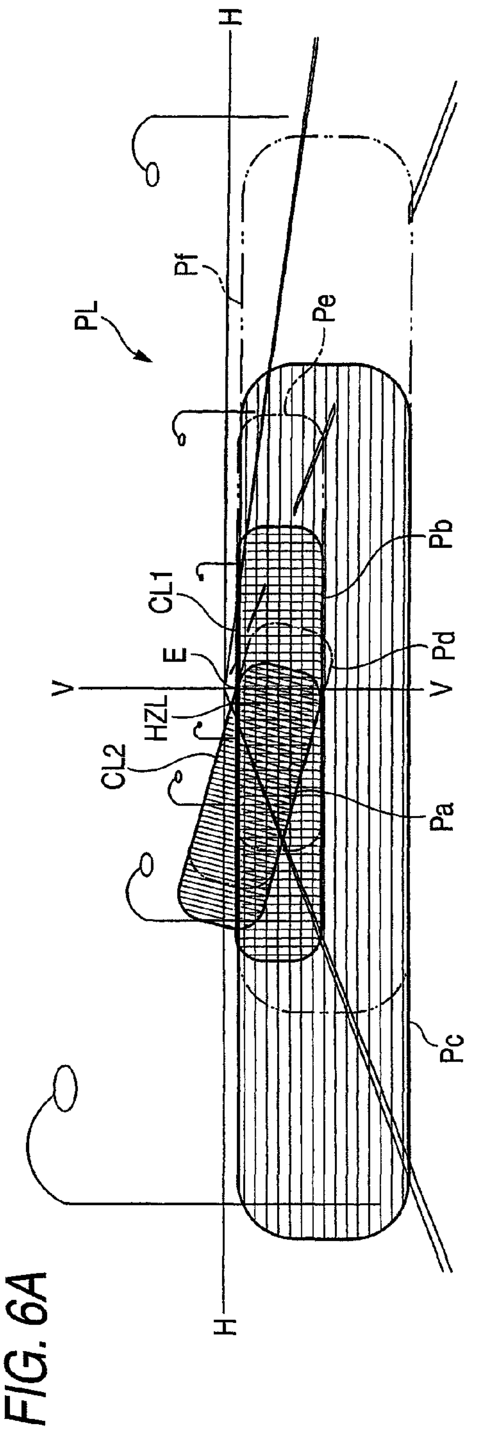
FIG. 6A is a perspective view showing, on an imaginary vertical screen disposed 25*m* in front of the left-side headlamp of FIG. 2, a low-beam light distribution pattern formed by light forwardly irradiated from the left-side headlamp.

FIG. 6A is a perspective view showing, on an imaginary vertical screen disposed 25*m* in front of the left-side headlamp 10L of FIG. 2, a low-beam light distribution pattern PL formed by the light forwardly irradiated from the left-side headlamp 10L.

As shown in FIG. 6A, the low-beam light distribution pattern PL is for the left-hand traffic, and has a horizontal cut-off line CL1 and an oblique cut-off line CL2 along an upper edge thereof. An elbow point E, at which the two cut-off lines CL1, CL2 intersect, is disposed about 0.5° to about 0.6° below a vanishing point H-V in the forward direction of the vehicle 2. In the low-beam light distribution pattern PL, a hot zone HZL, which is an area having a high luminous intensity, is formed so as to surround the left side region of the elbow point E.

The horizontal cut-off line CL1 is formed on the right side of the line V-V passing through the point H-V, i.e., on a side of an oncoming vehicle lane, while the oblique cut-off line CL2 is formed on the left side of the line V-V so as to extend obliquely upward (e.g., by about 15°) with respect to the horizontal cut-off line CL1.

The low-beam light distribution pattern PL is formed by combining three light distribution patterns Pa, Pb, Pc.

The light distribution pattern Pa is formed by the light irradiated from the lamp unit 30L, and the oblique cut-off line CL2 is formed by an upper edge of the light distribution pattern Pa. A vertical width of the light distribution pattern Pa is relatively narrow, and a horizontal diffuse angle of the light distribution pattern Pa is relatively small. The light distribution pattern Pa extends upward from near the elbow point E toward the left. The vertical width of the light distribution pattern Pa is narrow for the reason that the light emitting element 32 of the lamp unit 30L is arranged such that the long side of the light emitting chip 32*a* thereof extends in the horizontal direction.

The light distribution pattern Pb is formed by the light irradiated from the lamp unit 40L, and the horizontal cut-off line CL1 is formed by an upper edge of the light distribution pattern Pb. A vertical width of the light distribution pattern Pb is relatively narrow, and a horizontal diffuse angle of the light distribution pattern Pb is relatively small. The light distribution pattern Pb extends in the horizontal direction across the line V-V, and a center thereof is disposed slightly on the left side of the line V-V. The vertical width of the light distribution pattern Pb is narrow for the same reason as the light distribution pattern Pa, i.e., the light emitting element 32 of the lamp unit 40L is arranged such that the long side of the light emitting chip 32*a* thereof extends in the horizontal direction.

The light distribution pattern Pc is formed below the cut-off lines CL1, CL2 by the light irradiated from the lamp unit 50L. A vertical width of the light distribution pattern Pc is relatively wide, and a horizontal diffuse angle of the light distribution pattern Pc is relatively large. The light distribution pattern Pc extends in the horizontal direction across the line V-V, and a center thereof is disposed on the left side of the center of the light distribution pattern Pb. The vertical width of the light distribution pattern Pc is wide for the reason that the light emitting element 32 of the lamp unit 50L is arranged such that the long side of the light emitting chip 32*a* thereof extends in the vertical direction.

Figure 6B:
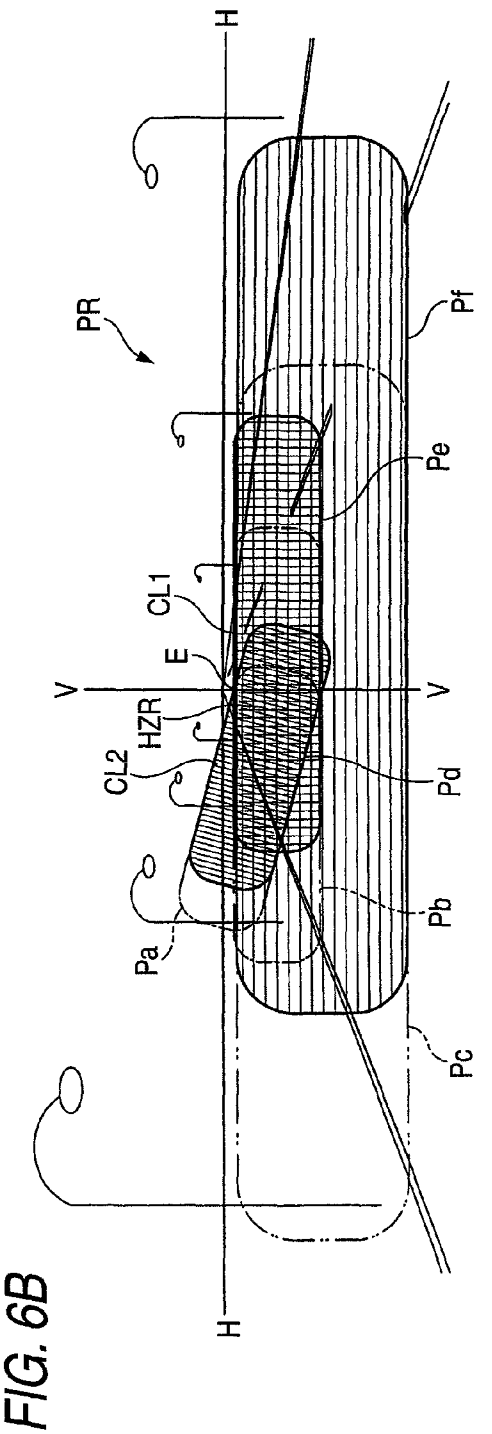
FIG. 6B is a perspective view showing, on the imaginary vertical screen disposed 25*m* in front of the right-side headlamp FIG. 3, a low-beam light distribution pattern formed by light forwardly irradiated from the right-side headlamp.

FIG. 6B is a perspective view showing, on an imaginary vertical screen disposed 25*m* in front of the right-side headlamp 10R of FIG. 3, a low-beam light distribution pattern PR formed by the light forwardly irradiated from the right-side headlamp 10R.

As shown in FIG. 6B, the low-beam light distribution pattern PR is also for the left-hand traffic, and has a horizontal cut-off line CL1 and an oblique cut-off line CL2 along an upper edge thereof. An elbow point E is disposed about 0.5° to about 0.6° below the point H-V The low-beam light distribution pattern PL also has a hot zone HZR which is formed so as to surround the left side region of the elbow point E.

The low-beam light distribution pattern PR is formed by combining three light distribution patterns Pd, Pe, Pf.

The light distribution pattern Pd is formed by the light irradiated from the lamp unit 30R, and the oblique cut-off line CL2 is formed by an upper edge of the light distribution pattern Pd. A vertical width of the light distribution pattern Pd is relatively narrow, and a horizontal diffuse angle of the light distribution pattern Pd is relatively small. The light distribution pattern Pd extends upward from a position below and right side of the elbow point E toward the left. The vertical width of the light distribution pattern Pd is narrow for the reason that the light emitting element 32 of the lamp unit 30R is arranged such that the long side of the light emitting chip 32*a* thereof extends in the horizontal direction.

The light distribution pattern Pe is formed by the light irradiated from the lamp unit 40R, and the horizontal cut-off line CL1 is formed by an upper edge of the light distribution pattern Pe. A vertical width of the light distribution pattern Pe is relatively narrow, and a horizontal diffuse angle of the light distribution pattern Pe is relatively small. The light distribution pattern Pe extends in the horizontal direction across the line V-V, and a center thereof is disposed slightly on the right side of the line V-V The vertical width of the light distribution pattern Pe is narrow for the same reason as the light distribution pattern Pd, i.e., the light emitting element 32 of the lamp unit 40R is arranged such that the long side of the light emitting chip 32*a* thereof extends in the horizontal direction.

The light distribution pattern Pf is formed below the cut-off lines CL1, CL2 by the light irradiated from the lamp unit 50R. A vertical width of the light distribution pattern Pf is relatively wide, and a horizontal diffuse angle of the light distribution pattern Pf is relatively large. The light distribution pattern Pc extends in the horizontal direction across the line V-V, and a center thereof is disposed on the right side of the center of the light distribution pattern Pe. The vertical width of the light distribution pattern Pf is wide for the reason that the light emitting element 32 of the lamp unit 50R is arranged such that the long side of the light emitting chip 32*a* thereof extends in the vertical direction.

The light distribution patterns Pb, Pc of the low-beam light distribution pattern PL shown in FIG. 6A and the light distribution patterns Pe, Pf of the low beam light distribution pattern PR shown in FIG. 6B are transversely symmetrical with each other with respect to the line V-V The light distribution pattern Pa of the low-beam light distribution pattern PL and the light distribution pattern Pd of the low-beam light distribution pattern PR are formed in such a manner as to slightly deviate from each other in a direction along the oblique cut-off line CL2. The light distribution pattern Pa is formed above and on the left side than the light distribution pattern Pd. This is because the light reflected in a leftward direction by the reflector 34L of the lamp unit 30L of the left-side headlamp 10L is less shielded by the extension member 20, as compared with the light reflected in a leftward direction by the reflector 34R of the lamp unit 30R of the right-side headlamp 10R.

According to the vehicle headlamp system 100 of the above-described exemplary embodiment, the low-beam light distribution patterns PL, PR are formed by the lights irradiated from the respective headlamps 10R, 10L, and are combined together to widely irradiate the road surface ahead of the vehicle 2.

As described above, in the vehicle headlamp system 100, each of the lamp units 30R, 40R, 50R, 30L, 40L, 50L of the headlamps 10R, 10L includes the light emitting element 32 facing the inner side in the width direction of the vehicle 2 and the reflector 34R, 44R, 54R, 34L, 44L, 54L disposed on the inner side of the corresponding light emitting element 32 to forwardly reflect the light from the corresponding light emitting element 32. Thus, although the transparent covers 14 of the respective headlamps 10R, 10L are formed so as to extend rearward from the inner side to the outer side with respect to the width direction of the vehicle 2, the space used by the respective lamp units 30R, 40R, 50R, 30L, 40L, 50L in the width direction of the vehicle 2 can be suppressed and is small. Moreover, because the transparent covers 14 of the respective headlamps 10R, 10L are formed so as to extend rearward from the inner side to the outer side with respect to the width direction of the vehicle 2, the respective reflectors 34R, 44R, 54R, 34L, 44L, 54L can be configured to extend toward the forward direction. Therefore, solid angles, within which the light from the light emitting centers of the respective light emitting elements 32 incident on the corresponding one of the reflecting surfaces 34La, 44La, 54La, 34Ra, 44Ra, 54Ra can be sufficiently ensured, thereby enhancing the lamp efficiency of the respective lamp units 30R, 40R, 50R, 30L, 40L, 50L.

Consequently, even if more than one lamp units, each having a light emitting element as a light source thereof, are provided in respective headlamps on right and left sides of the vehicle (e.g., three lamp units 30R, 40R, 50R, 30L, 40L, 50L are provided in the respective headlamps 10R, 10L in the exemplary embodiment), each of the headlamps can be configured to be a compact size.

According to the exemplary embodiment described above, each of the headlamps 10R, 10L, includes a first lamp unit, i.e., the lamp unit 40L, 40R, configured to irradiate light for forming the horizontal cut-off line CL1 of the low-beam light distribution pattern PL, PR, a second lamp unit, i.e., the lamp unit 30L, 30R, configured to irradiate light for forming the oblique cut-off line CL2 of the low-beam light distribution pattern PL, PR, and a third lamp unit, i.e., the lamp unit 50L, 50R configured to irradiate light for forming a diffuse light distribution pattern extending in the horizontal direction below the horizontal cut-off line CL1 and the oblique cut-off line CL2. Because a light distribution function of each of the lamp units 30R, 40R, 50R, 30L, 40L, 50L is simplified, it possible to control the light distribution with better accuracy.

According to the exemplary embodiment described above, the light emitting elements 32 of the lamp units 30L, 30R, which irradiate light for forming the oblique cut-off line CL2, and the light emitting elements 32 of the lamp units 40L, 40R, which irradiate light for forming the horizontal cut-off line CL1 are disposed such that a dimension of the light emitting surface of the light emitting chip 32*a* thereof is longer in the horizontal direction than the vertical direction respectively. Therefore, bright light distribution patterns Pa, Pb, Pc, Pd having a narrow vertical width are formed along the horizontal cut-off line CL1 and the oblique cut-off line CL2, thereby improving visibility of the road surface far ahead of the vehicle. The light emitting elements 32 of the lamp units 50L, 50R are disposed such that a dimension of the light emitting surface of the light emitting chip 32*a* is longer in the vertical direction than the horizontal direction. Therefore, the vertical width of the light distribution pattern Pc, which is formed so as to diffuse in the horizontal direction below the horizontal cut-off line CL1 and the oblique cut-off line CL2, is relatively large, thereby irradiating the road surface ahead of the vehicle in a wide range in the traveling direction.

According to the exemplary embodiment described above, the light emitting element 32 of the lamp unit 30L of the left-side headlamp 10L is disposed to face the inner side in the width direction of the vehicle 2 and obliquely downward with respect to the vertical direction, while the light emitting element 32 of the lamp unit 30R of the right-side headlamp 10R is disposed to face the inner side in the width direction of the vehicle 2 and obliquely upward with respect to the vertical direction. Thus, the following advantages can be obtained.

As for the lamp unit 30L of the left-side headlamp 10L, a region of the reflecting surface 34La of the reflector 34L disposed obliquely downward on the right side of the light emitting element 32 largely contributes to form the oblique cut-off line CL2, and because the light emitting element 32 is disposed such that the light emitting surface thereof faces obliquely downward with respect to the vertical direction, it is possible to cause the light from the light emitting element 32 to be incident on the region of the reflecting surface 34La of the reflector 34L, which is disposed obliquely downward from the light emitting element 32, as much as possible. As for the light unit 30R of the right-side headlamp 30R, a region of the reflecting surface 34Ra of the reflector 3RR disposed obliquely upward on the left side of the light emitting element 32 largely contributes to form the oblique cut-off line CL2, and because the light emitting element 32 is disposed such that the light emitting surface thereof faces obliquely upward with respect to the vertical direction, it is possible to cause the light from the light emitting element 32 to be incident on the region of the reflecting surface 34Ra of the reflector 3RL, which is disposed obliquely downward from the light emitting element 32, as much as possible.

According to the exemplary embodiment described above, the lamp units 40L, 50L of the left-side headlamp 10L are configured to irradiate light in a leftward direction with respect to the forward direction, and the lamp units 40R, 50R of the right-side headlamp 10R is configured to irradiate light in a rightward direction with respect to the forward direction. Therefore, most of the light reflected by the reflectors 40L, 50L, 40R, 50R of the respective lamp units 40L, 50L, 40R, 50R can be forwardly irradiated without being shielded by the extension member 20 on the inner side of each of the reflectors 40L, 50L, 40R, 50R.

Further, both of the lamp units 30L, 30R of the respective headlamps 10R, 10L are configured to irradiate light in the leftward direction with respect to the forward direction in order to for the oblique cut-off line CL2. However, the right-hand lamp unit 30R is configured to have a smaller amount of deflection of the light in the leftward direction than the left-hand lamp unit 30L. Therefore, it is possible to lessen an amount of light reflected by the reflector 34R of the right-hand lamp unit 30R to be shielded by the extension member 20 disposed on the inner side of the reflector 34R.

In the above-described exemplary embodiment of the present invention, the light emitting element 32 of each of the lamp units 50L, 50R is disposed such that the dimension of the light emitting surface of the light emitting chip 32*a* thereof is longer in the vertical direction than in the horizontal direction. However, according to another exemplary embodiment of the present invention, the light emitting element 32 of each of the lamp units 50L, 50R may be disposed such that the dimension of the light emitting surface of the light emitting chip 32*a* thereof is longer in the horizontal direction than in the vertical direction like the light emitting elements 32 of the lamp units 40L, 40R. In a case where the light emitting element 32 of each of the lamp units 50L, 50R is arranged like the light emitting elements 32 of the lamp units 40L, 40, a vertical width of a light distribution pattern formed below the horizontal and oblique cut-off lines becomes smaller than the light distribution patterns Pc, Pf, whereby the low-beam light distribution pattern PL which is more focused on distant visibility can be obtained.

In the above-described exemplary embodiment, the left-side headlamp 10L includes the three lamp units 30L, 40L, 50L and the right-side headlamp 10R includes the three lamp units 30R, 40R, 50R. However, according to another exemplary embodiment of the present invention, more than three lamp units may incorporated in the respective the headlamps 10R, 10L while maintaining similar advantages.

In the above-described exemplary embodiment, each of the headlamps 10R, 10L is configured such that it can irradiate light only for forming a low-beam light distribution pattern and a high-beam light distribution pattern is formed by a separate headlamps. However, in another exemplary embodiment of the present invention, the headlamps may irradiate light also for forming a high-distribution pattern.

In the above-described exemplary embodiment, the light emitting elements 32 are white light emitting diodes. However, according to another exemplary embodiment, the light emitting elements may be other kinds of light emitting diodes, or may be laser diodes.

Further, a configuration of a reflector for the respective lamp units 30R, 40R, 50R, 30L, 40L, 50L is not restricted to the configuration of each of the reflectors 34R, 44R, 54R, 34L, 44L, 54L of the above-described exemplary embodiment, and may be any configurations in so far as it is operable to forwardly irradiate light from the corresponding one of the light emitting element.

While exemplary embodiments of the present invention have been described above, those skilled in the art will understand that various changes and modifications may be made therein without departing from the spirit and scope of the present invention. For example, numerical values in the above description of the exemplary embodiments may, of course, be set to different values as is advantageous. It is aimed, therefore, to cover in the appended claims all such changes and modifications falling within the true spirit and scope of the present invention.

What is claimed is:

1. A headlamp system for a vehicle, the headlamp system comprising a plurality of headlamps, one of the plurality of headlamps disposed on each of the right and left sides of a front end portion of the vehicle, wherein each of the headlamps comprises:

a lamp body having an opening portion;

a transparent cover attached to the opening portion of the lamp body to form a lamp chamber, an outer side portion of the transparent cover with respect to a width direction of the vehicle extending toward a rear side of the vehicle; and a plurality of lamp units arranged inside the lamp chamber along the width direction of the vehicle, wherein each of the lamp units comprises:

a light emitting chip disposed such that a light emitting surface thereof faces an inner side in the width direction of the vehicle; and a reflector disposed on an inner side of the light emitting chip with respect to the width direction of the vehicle to forwardly reflect light from the corresponding light emitting chip, wherein the plurality of lamp units of each of the headlamps comprises:

a first lamp unit configured to irradiate light for forming a horizontal cut-off line of a low-beam light distribution pattern;

a second lamp unit configured to irradiate light for forming an oblique cut-off line of the low-beam light distribution pattern;

and a third lamp unit configured to irradiate light for forming a diffused light distribution pattern extending in a horizontal direction below the horizontal cut-off line and oblique cut-off line.

2. The headlamp system according to claim 1, wherein each of the light emitting chips of the first and second lamp units are disposed such that a dimension of the light emitting surface thereof is longer in the horizontal direction than in a vertical direction, and the light emitting chip of the third lamp unit is disposed such that a dimension of the light emitting surface thereof is longer in the vertical direction than the horizontal direction.

3. The headlamp system according to claim 2, wherein the light emitting chip of the second lamp unit of the headlamp on the left side of the vehicle is disposed such that the light emitting surface thereof faces obliquely downward with respect to the vertical direction, and the light emitting chip of the second lamp unit of the headlamp on the right side of the vehicle is disposed such that the light emitting surface thereof faces obliquely upward with respect to the vertical direction.

4. The headlamp system according to claim 1, wherein the reflector extends only toward the inner side of the light emitting chip.

5. A headlamp for a vehicle, the headlamp comprising:

a lamp body having an opening portion;

a transparent cover attached to the opening portion of the lamp body to form a lamp chamber, an outer side portion of the transparent cover with respect to a width direction of the vehicle extending toward a rear side of the vehicle; and a plurality of lamp units arranged inside the lamp chamber along the width direction of the vehicle, wherein each of the lamp units comprises:

a light emitting chip disposed such that a light emitting surface thereof faces an inner side in the width direction of the vehicle; and a reflector disposed on an inner side of the light emitting chip with respect to the width direction of the vehicle to forwardly reflect light from the corresponding light emitting chip, wherein the plurality of lamp units comprises:

a first lamp unit configured to irradiate light for forming a horizontal cut-off line of a low-beam light distribution pattern;

a second lamp unit configured to irradiate light for forming an oblique cut-off line of the low-beam light distribution pattern;

and a third lamp unit configured to irradiate light for forming a diffused light distribution pattern extending in a horizontal direction below the horizontal cut-off line and oblique cut-off line.

6. The headlamp according to claim 5, wherein each of the light emitting chips of the first and second lamp units are disposed such that a dimension of the light emitting surface thereof is longer in a horizontal direction than in a vertical direction, and the light emitting chip of the third lamp unit is disposed such that a dimension of the light emitting surface thereof is longer in the vertical direction than the horizontal direction.

7. The headlamp according to claim 5, further comprising a metallic bracket on which the plurality of lamp units are fixedly supported, wherein the metallic bracket is supported by the lamp body so as to be tiltable in a horizontal direction and in a vertical direction.

8. The headlamp according to claim 5, wherein the first lamp unit is disposed on a rear side of the third lamp unit relative to a front to rear direction of the vehicle, and the second lamp unit is disposed on a rear side of the first lamp unit relative to the same front to rear direction of the vehicle.

9. The headlamp according to claim 5, wherein the first lamp unit is disposed on an outer side of the third lamp unit with respect to the width direction of the vehicle, and the second lamp unit is disposed on an outer side of the first lamp unit with respect to the width direction of the vehicle.

10. The headlamp system according to claim 5, wherein the reflector extends only toward the inner side of the light emitting chip.

11. A headlamp for a vehicle, the headlamp comprising:

a lamp body having an opening portion;

a transparent cover attached to the opening portion of the lamp body to form a lamp chamber, an outer side portion of the transparent cover with respect to a width direction of the vehicle extending toward a rear side of the vehicle; and a plurality of lamp units arranged inside the lamp chamber along the width direction of the vehicle, wherein each of the lamp units comprises:

a light emitting element disposed such that a light emitting surface thereof faces an inner side in the width direction of the vehicle; and a reflector disposed on an inner side of the light emitting element with respect to the width direction of the vehicle to forwardly reflect light from the corresponding light emitting element, wherein the plurality of lamp units comprises:

a first lamp unit configured to irradiate light for forming a horizontal cut-off line of a low-beam light distribution pattern;

a second lamp unit configured to irradiate light for forming an oblique cut-off line of the low-beam light distribution pattern; and a third lamp unit configured to irradiate light for forming a diffused light distribution pattern extending in a horizontal direction below the horizontal cut-off line and the oblique cut-off line.

12. The headlamp according to claim 11, wherein each of the light emitting elements of the first and second lamp units are disposed such that a dimension of the light emitting surface thereof is longer in a horizontal direction than in a vertical direction, and the light emitting element of the third lamp unit is disposed such that a dimension of the light emitting surface thereof is longer in the vertical direction than the horizontal direction.

13. The headlamp according to claim 11, further comprising a metallic bracket on which the plurality of lamp units are fixedly supported, wherein the metallic bracket is supported by the lamp body so as to be tiltable in a horizontal direction and in a vertical direction.

14. The headlamp according to claim 11, wherein the first lamp unit is disposed on a rear side of the third lamp unit relative to a front to rear direction of the vehicle, and the second lamp unit is disposed on a rear side of the first lamp unit relative to the same front to rear direction of the vehicle.

15. The headlamp according to claim 11, wherein the first lamp unit is disposed on an outer side of the third lamp unit with respect to the width direction of the vehicle, and the second lamp is disposed on an outer side of the first lamp unit with respect to the width direction of the vehicle.

* * * * *